(12) United States Patent
Kim et al.

(10) Patent No.: US 7,486,873 B2
(45) Date of Patent: Feb. 3, 2009

(54) VIDEO REPRODUCTION APPARATUS AND INTELLIGENT SKIP METHOD THEREFOR

(75) Inventors: Tae Hyoung Kim, Seoul (KR); Kyoung Ro Yoon, Seoul (KR); Sung Bae Jun, Seoul (KR); Bae Geun Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 776 days.

(21) Appl. No.: 10/540,425

(22) PCT Filed: Dec. 24, 2003

(86) PCT No.: PCT/KR03/02827

§ 371 (c)(1),
(2), (4) Date: Jun. 24, 2005

(87) PCT Pub. No.: WO2004/059972

PCT Pub. Date: Jul. 15, 2004

(65) Prior Publication Data

US 2006/0098942 A1 May 11, 2006

(30) Foreign Application Priority Data

Dec. 24, 2002 (KR) .................. 10-2002-0082990

(51) Int. Cl.
*H04N 5/76* (2006.01)
(52) U.S. Cl. .......................................... 386/68; 386/69
(58) Field of Classification Search ...................... 386/1, 386/45–46, 68–70, 125–126
See application file for complete search history.

(56) References Cited

U.S. PATENT DOCUMENTS 5,754,728 A * 5/1998 Nakajima et al. ............. 386/68
6,490,404 B1 * 12/2002 Kuroiwa et al. ............... 386/52

FOREIGN PATENT DOCUMENTS

EP 1134975 9/2001

* cited by examiner

*Primary Examiner*—Thai Tran
*Assistant Examiner*—Nigar Chowdhury
(74) *Attorney, Agent, or Firm*—Lee, Hong, Degerman, Kang & Waimey

(57) ABSTRACT

The present invention relates to a video reproducing apparatus and an intelligent skip method, which can provide an intelligent skip. Particularly, there is provided an apparatus and method for forward or reverse intelligent skips based on Group of Shots (GOS) using shot information of contents.

11 Claims, 3 Drawing Sheets

| Start Location | End Location |
|---|---|
| 0 | 110 |
| 111 | 126 |
| 127 | 800 |
| 801 | 910 |
| ⋮ | |

Individual Shot Information — Section information — Frame Number

VIDEO REPRODUCTION APPARATUS AND INTELLIGENT SKIP METHOD THEREFOR

TECHNICAL FIELD

The present invention relates to a video reproducing apparatus, and more particularly, to a video reproducing apparatus and an intelligent skip method therefor, in which an intelligent skip based on Group of Shots (GOS) is provided using a very simple index, called shot information of contents.

BACKGROUND ART

Today, as multimedia contents become huge, there is a demand for an automated system that can select data desired by a user. Recently, due to development of a moving picture stream recording/reproducing apparatus, for example, personal video recorder (PVR), which records an incoming moving picture stream and reproduces the recorded moving picture stream, an automated system that can select data desired by a user is demanded very frequently.

Particularly, in the moving picture stream recording/reproducing apparatus such as PVR, the function of selecting and searching data desired by a user is very useful for an edition of a user's own contents as well as a simple browsing. In other words, users want to watch contents in which advertisements or uninteresting portions are excluded and want to edit and store desired portions separately.

In addition, according to the moving picture stream recording/reproducing apparatus such as PVR, a moving stream which goes on the air can be recorded on a digital media, and a replay of a corresponding content can be always requested. Further, it is possible to provide a random access to a desired location or a high-speed quick view function, which is impossible in an analog video.

Meanwhile, as one of methods for analyzing the multimedia contents, video index technologies have been researched for long terms. Among them, a shot segmentation technology has been known as a technology that analyzes the video contents at a very high accuracy. The shot segmentation technology divides the video contents into shots that are a physical edition unit. In general, most of the shot segmentation technologies have the high accuracy of 95% or more. Additionally, the shot segmentation technology can be integrated into the moving picture stream recording/reproducing apparatus such as PVR. For example, shot index can be generated through the recording and analysis of the video contents by using the shot segmentation technology.

A time-based skip is typically proposed for providing the random access to user in a TV-like environment, such as PVR. The time-based skip moves a reproduction location of the media 20 seconds after or 7 seconds before a current location, thereby moving to a location desired by the user. According to the time-based skip, however, it is impossible to accurately move to the desired location. Further, in order to move a similar location, a large number of user inputs are necessary.

In addition, fast forward/fast rewind (FF/FR) functions are provided to the user in order for the high speed searching. However, in case the FF or FR function is required for moving the desired location, the use must carefully watch the reproduction of the media in order to check whether the reproduction location arrives at the desired location while the media is being reproduced in FF or FR mode. Therefore, the user may suffer from dizziness during an operation of the FF or FR. Further, a difference between the user's recognition speed and the reproduction speed of the media makes it difficult to reproduce the media from the desired location.

In order to solve these problems, a scene-based skip has been proposed. The scene-based skip changes the reproduction location of the media by a scene unit, not by a shot unit. Here, the scene unit is a conversation structure unit that is greater than the shot unit. According to the scene-based skip, the reproduction location of the media is changed by the logical scene unit. However, in the application of a method for automatically detecting scenes, the current technology is limited to specific genre (news, drama, etc.). Therefore, it is difficult to apply the method to video contents of all genres. Further, since the user demands both the shot-based skip and the scene-based skip at the same time, it is difficult to provide a limited user interface (UI) with both functions.

DISCLOSURE OF THE INVENTION

Accordingly, the present invention is directed to a video reproducing apparatus and an intelligent skip method therefor that substantially obviates one or more of the problems due to limitations and disadvantages of the related art.

An object of the present invention is to provide a video reproducing apparatus and an intelligent skip method therefor, which makes it possible to easily move to a desired location by skipping a reproduction location of a media by GOS unit using a Group of Shots (GOS) obtained by a shot segmentation information and a shot section information applicable regardless of video genres on an assumption that a location where a user intends to move in order for a searching or edition is mostly a start location of a certain scene.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an intelligent skip method for a video reproducing apparatus comprises the steps of: calculating a GOS, to which a reproduction location of a current media belongs, according to a user's intelligent skip request, based on a current reproduction location of a media and a shot segmentation information or GOS information constituted with one long shot or a sequence of shot shots; determining whether the user's intelligent skip request is forward or reverse, based on the calculated GOS (GOScur) to which the reproduction location of the current media belongs; if the user's intelligent skip request is the forward skip request, setting a start time of a next GOS (GOScur+1) as a start time of a normal reproduction restart, and if the user's intelligent skip request is the reverse skip request, setting a start location of a GOS (GOScur), to which a reproduction location of a current media belongs, as a start time of a normal reproduction restart or setting a GOS (GOScur−1), which is before one from the GOS to which the reproduction location of the current media belongs, as a normal reproduction restart location; and performing a normal reproduction from the set normal reproduction restart location.

In another aspect of the present invention, there is provided an intelligent skip method for a video reproduction apparatus, comprising the steps of: based on a current reproduction location of a media and a shot segmentation information or a GOS information considering sequential shots having an identical length characteristic as one GOS, calculating a GOS to which a reproduction location of a current media according to a user's intelligent skip request and determining whether a type of the GOS is a GOS defined as one long shot or a sequence of short shots; based on the GOS (GOScur) to which the calculated reproduction location of the current media belongs, determining whether the user's intelligent skip request is forward or reverse; if the user's intelligent skip request is the forward skip request, setting a start location of a GOS, which is nearest from the current location among following GOSs (GOSr:r>cur) each being constituted with one long shot, as a start time of a normal reproduction restart; if the user's intelligent skip request is the reverse skip request and the GOS (GOScur) is a GOS constituted with one long shot, setting the start location of the GOS, to which the reproduction location of the current media belongs, as a start time of a normal reproduction restart time, or setting a start location of a GOS, which is nearest from the current location among GOSs (GOSr:r<cur) each being constituted with one long shot before the reproduction location of the current media, as a start time of a normal reproduction restart; if the user's intelligent skip request is the reverse skip request and the GOS (GOScur) to which the reproduction location of the current media belongs is a GOS constituted with a sequence of short shots, setting a start location of a GOS, which is nearest from the current location among the GOSs (GOSr: r<cur) each being constituted with one long shot before the reproduction location of the current media, as a start time of a normal reproduction restart; and performing a normal reproduction from the set normal reproduction restart location.

In further another aspect of the present invention, there is provided a video reproducing apparatus comprising: a user interface means configured to receive a user command for an intelligent skip in order to perform a searching and browsing of digital video data; a control means for controlling a forward or reverse intelligent skip using a shot segmentation information and a GOS information with respect to corresponding video stream according to the user command inputted through the user interface means; a media storage means for providing a video stream with respect to the request of the control means; and a display means for reproducing the video stream in which the intelligent skip is performed by the control means.

According to the video reproducing apparatus and the intelligent skip method of the present invention, it is possible to skip the advertisement scenes and to easily move to the accurate location (e.g., an anchor scene in news program) desired in the contents, which are impossible in the conventional time unit skip or FF/FR function.

Additionally, it is possible to fast move to the desired location with respect to the appropriate user input because the scene skip of very small unit is provided or the skip of very large unit is not provided.

Further, since the detection of the scene unit is not demanded, the present invention is not dependent on genre. Since the structure of the index generating unit also demands only the scene change detecting module, it is possible to provide the automation having a high degree accuracy.

Furthermore, the present invention can be implemented with the basic skip type in which undesired portions are not reproduced and the modified skip type in which undesired portion is reproduced at a fast speed and the normal reproduction is restarted from the desired location.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Hereinafter, preferred embodiments of the present invention will be described in detail with reference to accompanying drawings.

Figures 1, 2:
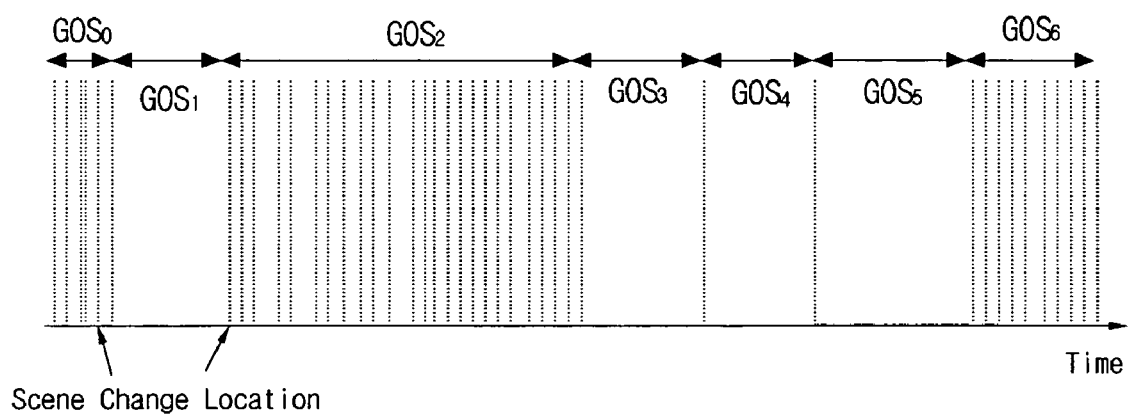
FIG. 1 is an exemplary diagram of a general shot index information.
FIG. 2 is an exemplary diagram of a GOS structure used in an intelligent skip method for a video reproducing apparatus according to the present invention.

Generally, a shot index is constituted with a list of shot information and an individual shot information includes section information of minimum shot. A shot section information includes a start location and an end location of a corresponding shot in a corresponding content. In FIG. 1, an example of the shot index is shown exemplarily. The individual shot information includes a minimum section information (a start location and an end location). The individual shot information may include other additional information (a representative frame information, an average motion amount information, etc.), and a time duration or a length information can be calculated by "end location—start location"

Group of Shots (GOS) is defined by a sequence of shots having the identical characteristic. In this invention, the identical characteristic of the GOS is limited to a shot length. Additionally, it can be limited that a shot longer than a predetermined length separately constitutes one GOS. FIG. 2 is an exemplary diagram of a GOS structure using the shot length information. In FIG. 2, sequential shots having the shot length less than a predetermined value (ts) belong to one GOS and sequential shots having the shot length more than the predetermined value (ts) respectively constitutes one GOS. Since the shot length information is easily obtained from the information of the "shot end location—shot start location", the GOS information need not be described independently of the shot information. However, the GOS information can be previously recorded independently of the shot information in order to reduce a reaction time of the intelligent skip. In FIG. 2, GOS0, GOS2 and GOS6 are examples showing that sequential sections of short shots are registered as one GOS, and GOS1, GOS3, GOS4 and GOS5 are examples showing that one long shot is registered as one GOS.

Figure 3:
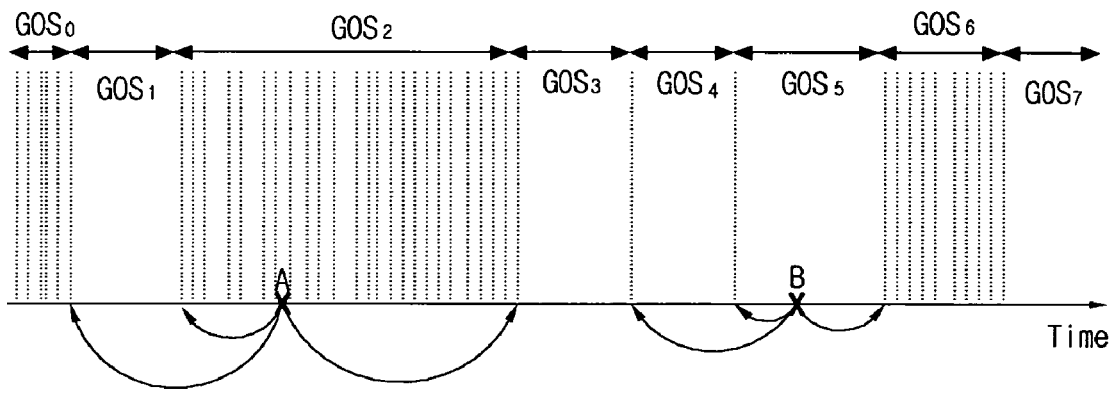
FIG. 3 is an exemplary diagram of a GOS-based intelligent skip in a video reproducing apparatus according to the present invention.

Herein, the intelligent skip method based on the GOS in the video reproducing apparatus according to the present invention will be described below. FIG. 3 is an exemplary diagram of the intelligent skip performed based on the GOS in the video reproducing apparatus according to the present invention.

In other words, like a skip based on a scene change, the intelligent skips based on the GOS are classified into a forward skip and a reverse skip. If the user requests the intelligent skip, GOS information that a media location belongs to is calculated based on reproduction location and shot segmentation information of a current media, and the intelligent skip is performed according to the forward or reverse skip request.

At this time, if the forward skip is requested by the user, a normal reproduction is restarted from a start location of a next GOS. Meanwhile, if the reverse skip is requested by the user, a reproduction location of a media is changed to a start location of a GOS to which a location of the current reproducing media belongs or a start location of a previous GOS.

In case of the reverse intelligent skip, various methods for selecting the reproduction location of a media are provided.

Among them, one method is to separate two functions and allow the user to select one function. Different input units for the two functions can be provided. For example, independent buttons can be provided, or one button with different operations can be provided (one click and a double click are reacted differently).

In another method, if an offset between the reproduction location of the media and the start location of the GOS to which the reproduction location of the media belongs is equal to or less than a predetermined level, a start location of a GOS before one from a GOS to which the reproduction location of the current media belongs is set as a start time of a reproduction restart. If not, the start location of the GOS to which the reproduction location of the current media belongs is set as the start time of the reproduction restart.

Here, in case the GOS is not detected previously and thus not recorded independently, the section information of each GOS is dynamically detected from the shot information (shot section information) and then corresponds to the intelligent skip. In case the GOS is indexed previously and independently in order to reduce the reaction time, the GOS index is used for the intelligent skip.

For example, if the intelligent skip is requested at a location "B" of FIG. 3, a start location of GOS6 is set as a start location of a normal reproduction restart with respect to the forward skip request, because the location "B" belongs to GOS5. In case of a reverse skip request, the location of the normal reproduction restart is a start location of a GOS5 or a start location of GOS4. Since this case is a case that a GOS to which the location "B" belongs is constituted with one long shot. Therefore, this case is produced in an identical manner as a skip based on a shot index.

If the intelligent skip is requested at a location "A", a start location of GOS3 is set as a start location of a normal reproduction restart with respect to the forward skip request, because the location "A" belongs to GOS2. In case of a reverse skip request, the location of the normal reproduction restart is a start location of GOS2 or a start location of GOS1. In this case, unlike a skip based on the shot index, the skip operation represents an effect that sequential sections of short segments are skipped at a time.

Herein, sequential procedures of the intelligent skip based on the GOS will be described below.

According to the skip function based on the GOS, the GOS to which the reproduction location of the current media belongs is calculated based on the user's intelligent skip request, the current reproduction location of the media and the shot segmentation information or the GOS information. Based on the calculated GOS (GOScur) to which the reproduction location of the current media belongs, it is determined whether or not the user's skip request is forward or reverse. In case of the forward skip request, a start location of a next GOS (GOScur+1) is set as a start location of a normal reproduction restart. In case of the reverse skip request, the start location of the GOS (GOScur) is set as a start location of the normal reproduction restart, or a GOS (GOScur−1) before one from the GOS (GOScur) is set as the start location of the normal reproduction restart. Through these processes, a random access based on GOS unit is provided with respect to the user's request for the location change of the normal reproduction restart.

Here, the GOS can be constituted with one long shot or a sequence of short shots. The short shot and the long shot are determined by checking whether or not the shot length exceeds a threshold value. A threshold value can be arbitrarily set to all contents and an adjustable threshold value in which characteristic of the contents is reflected can be used. Accordingly, the GOS constituted with one shot has one long shot as an element, and the GOS constituted with the sequence of several shots has the sequence of short shots as an element.

In this invention, the shot segmentation information can be provided from an outside of the system or can be provided by an automated scene change detecting system in an inside of the system. Additionally, the GOS information need not be stored separately because it can be easily extracted from the shot section information. However, in order to minimize the reaction time of the dynamic searching request, the GOS information can be previously extracted and independently indexed.

Two modifications are provided for a method for moving from the current reproduction location to the start time of the normal reproduction restart. Herein, the two modifications will be described below.

[Basic Method: Full Skip]

A basic method is to directly skip from the current reproduction location of the media to the start time of the normal reproduction restart. According to this method, the media reproduction is paused and the reproduction location of the media is replaced sequentially. Then, the normal reproduction is restarted from the corresponding location.

[Modification Method: Use of FF or FR Function]

According to a modification method, it is checked whether a section from the current reproduction location of the media to a start time of the normal reproduction restart is a forward skip request or a reverse skip request. According to the checking result, a corresponding section is reproduced using FF or FR function. Then, if it arrives at the normal reproduction restart location of the media, the normal reproduction is restarted from the corresponding location.

Meanwhile, most of the video contents are represented according to the characteristics of the sequential section of short scenes and the long scenes. If the intelligent skip function based on the GOS is used, advertisement scene or the like is directly skipped by the user's input requests one or two times, and it is possible to move to the start location of a desired content at a time. The reason is because general advertisement is constituted with a sequence of short scenes and most of the contents start from the long scene in order to indicate the start of the contents and concentrate the user on them. Of course, although there may be an advertisement constituted with a long scene among the advertisement scenes, most of the advertisements are generally constituted with the sequence of the short shots. In addition, since the scene change exists in every advertisement, the user can easily move to the start location of the content through the input operation three or four times at most.

Further, the intelligent skip method for use in the video reproducing apparatus according to the present invention can be used for the searching purpose within one content. In other words, a conversation scene in movie or drama is generally constituted with a sequence of long scenes, and an action scene or the like is constituted with a sequence of short sense.

Therefore, this method can be very conveniently used to quickly move between the conversation scene and the action scene.

Furthermore, in case of a music show, a fast scene change is used when a singer appears on the stage. Meanwhile, there is no scene change when a ballad singer appears. A scene in which an M.C. appears intermediately is also constituted with a long scene. Accordingly, if the intelligent skip is used in the music show, it is possible to quickly move between the scenes in which a singer appears.

Additionally, it can be effectively used in a news scene. In other words, an anchor scene in the news is mostly constituted with a long scene. Scenes in which a reporter covers news are constituted with a sequence of short shots. Accordingly, the intelligent skip function of GOS unit according to the present invention is used during a news video browsing, an accurate reproduction location change of news articles is possible. It is possible to provide a means for easily moving to a start location of desired main news.

Herein, a video skip method in a video reproducing apparatus according to another embodiment of the present invention will be described below.

The intelligent skip based on GOS can be modified variously. There are two types of GOS. One is a GOS constituted with a sequence of short shots and the other is a GOS constituted with one long shot. In order to maximize the described-above utilization, a start location of a GOS including only one shot is selected as the start location of the reproduction restart.

Figure 4:
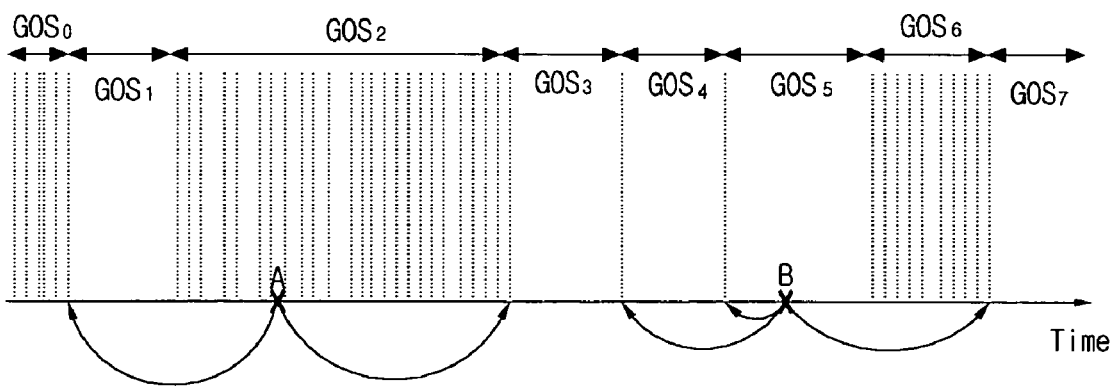
FIG. 4 is an exemplary diagram of an intelligent skip in which a GOS-type information is reflected in a video reproducing apparatus according to the present invention.

This method can easily skip advertisement scenes or reporter scenes in news and can quickly move to a start location of the content or a next or previous anchor scene. FIG. 4 is an exemplary diagram of the intelligent skip performed in consideration of the GOS type information in the video reproducing apparatus according to the present invention. Herein, an example of the GOS-based intelligent skip will be stepwise described below.

The GOS-based intelligent skip function calculates the GOS, to which the reproduction location of the current media belongs, based on the user's intelligent skip request, the current reproduction location of the media and the shot segmentation information or the GOS information that considers the sequential shots having the same length characteristic as one GOS. It is determined whether the type is a GOS defined as one long shot or a GOS defined as a sequence of short shots. Based on the GOS (GOScur) to which the reproduction location of the calculated current media belongs, it is determined whether the user's skip request is forward or reverse. If the skip request is forward, the start location of the GOS that is nearest from the current location among the following GOSs (GOSr:r>cur) each being constituted with one long shot is set as a start time of a normal reproduction restart. Meanwhile, if the skip request is reverse and the GOS (GOScur) is a GOS constituted with one long shot, the start location of the GOS to which the reproduction location of the current media belongs is set as a start time of a normal reproduction restart time, or a start location of a GOS that is nearest from the current location among the GOSs (GOSr:r<cur) each being constituted with one long shot before the reproduction location of the current media is set as a start time of a normal reproduction restart. In addition, if the user requests the reverse skip and the GOS (GOScur) is a GOS constituted with a sequence of short shots, a start location of a GOS that is nearest from the current location among the GOSs (GOSr: r<cur) each being constituted with one long shot before the reproduction location of the current media is set as a start time of a normal reproduction restart. In this manner, a random access based on GOS unit is provided with respect to the location change of the user's request for the normal reproduction restart.

If the intelligent skip function is used, the user can skip scenes constituted with a sequence of short shots at a time, such that advertisement scenes or reporter scenes in news can be easily skipped.

In case the reverse intelligent skip is requested and the GOS to which the reproduction location of the current media belongs is a GOS constituted with one long shot, a normal reproduction restart location is determined with a start location of the current GOS or a start location of a GOS that is nearest from the current location among the previous GOSs each being constituted with one long shot. The process can be set in various manners.

One method is to separate two functions and allow the user to select one function. Different input units for the two functions can be provided. For example, independent buttons can be provided or one button with different operations can be provided (one click and a double click are reacted differently).

In another method, if an offset between the reproduction location of the media and the start location of the GOS to which the reproduction location of the media belongs is equal to or less than a predetermined level, a reproduction restart location is set to a start location of a GOS that is nearest from the current location among the GOSs each being constituted with one long shot and disposed before the GOS to which the reproduction location of the current media belongs. If not, the start location of the GOS to which the reproduction location of the current media belongs is set as the start time of the reproduction restart. If not, the start location of the GOS to which the reproduction location of the current media belongs is set as the start time of the reproduction restart.

In addition, like the first embodiment, two modifications are provided for a method for moving from the current reproduction location to the start time of the normal reproduction restart. Herein, the two modifications will be described below.

[Basic Method: Full Skip]

A basic method is to directly skip from the current reproduction location of the media to the start time of the normal reproduction restart. According to this method, the media reproduction is paused and the reproduction location of the media is replaced sequentially. Then, the normal reproduction is restarted from the corresponding location.

[Modification Method: Use of FF or FR Function]

According to a modification method, it is checked whether a section from the current reproduction location of the media to a start time of the normal reproduction restart is a forward skip request or a reverse skip request. According to the checking result, a corresponding section is reproduced using FF or FR function. Then, if it arrives at the normal reproduction restart location of the media, the normal reproduction is restarted from the corresponding location.

For example, in case the intelligent skip is requested at a location "A" of FIG. 4, the location "A" belongs to a GOS2 that is constituted with a sequence of short shots. Therefore, in case of the reverse skip request, a reproduction restart location is determined with a start location of GOS1 that is nearest from the current location among the previous GOSs each being constituted with one long shot. In case of the forward skip request, a normal reproduction restart location is determined with a start location of GOS3 that is nearest from the current location among the next GOSs each being constituted with one long shot. In other words, in case of the reverse skip request, the normal reproduction restart location is not determined with the start location of the corresponding GOS because the reproduction location of the current media belongs to the GOS defined by a sequence of short shots.

Meanwhile, if the intelligent skip is requested at a location "B", the location "B" belongs to a GOS5 that is constituted with one long shot. Therefore, in case of the reverse skip request, it moves to a start location of the GOS5, or a reproduction restart location is determined with a start location of GOS4 that is nearest from the current location among the previous GOSs each being constituted with one long shot. In case of the forward skip request, a normal reproduction restart location is determined with a start location of GOS7 that is nearest from the current location among the next GOSs each being constituted with one long shot.

Figure 5:
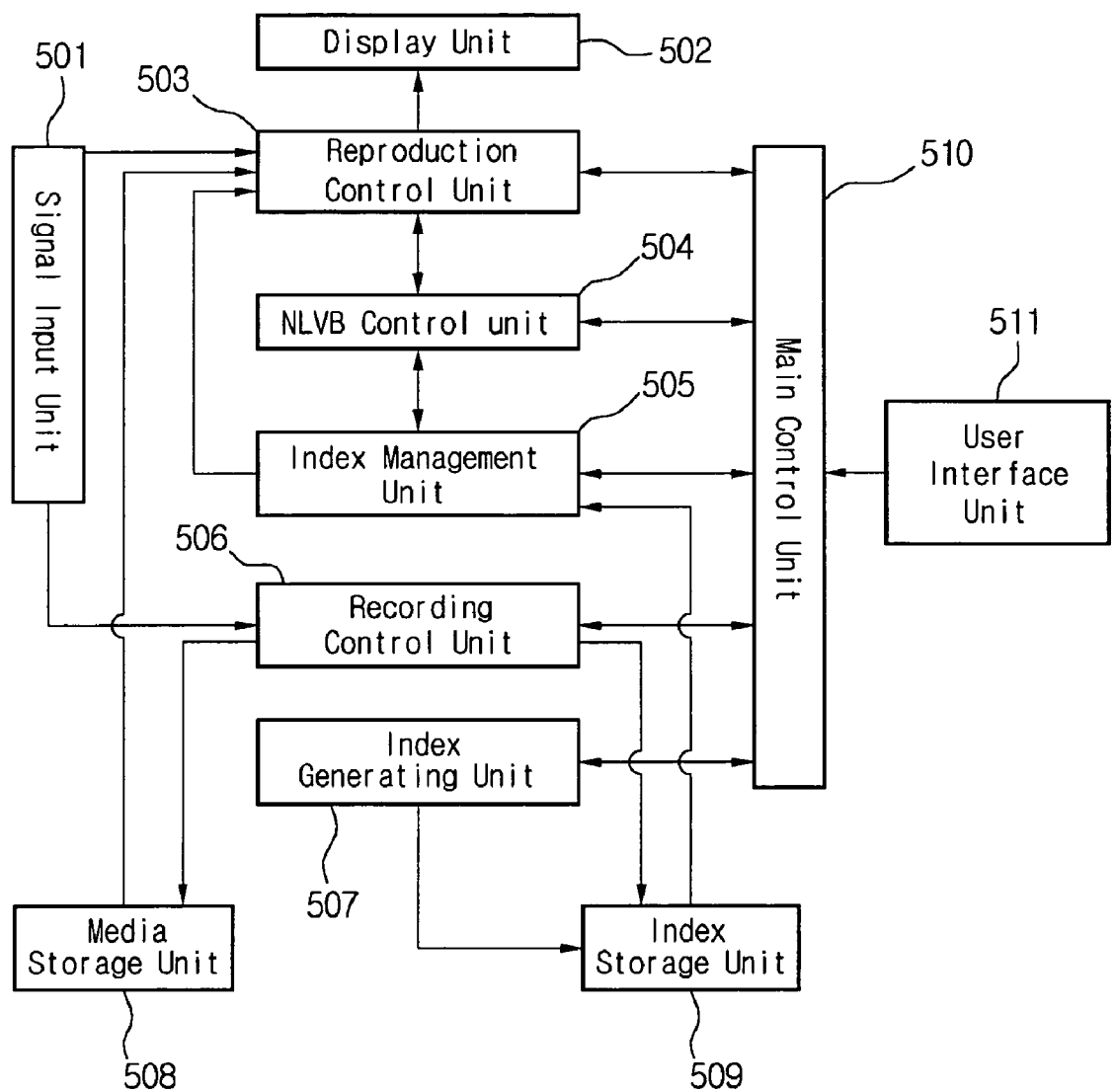
FIG. 5 is a schematic block diagram of a video reproducing apparatus according to the present invention.

In FIG. 5, there is shown a construction of a video reproducing apparatus for implementing the intelligent skip method. FIG. 5 is a schematic block diagram showing a construction of the video reproducing apparatus capable of providing reproduction/indexing/watching/nonlinear browsing for the intelligent skip function according to the present invention. Hereinafter, an operation of the video reproducing apparatus according to the present invention will be described in brief.

First, a signal input unit 501 is an input source of digital audio/video signals, and a display unit 502 is an output unit, such as monitor and speaker, for outputting the digital audio/video signals. A user interface 511 is an input unit, such as keyboard, mouse, remote controller and button, for receiving a user's input.

Here, a media storage unit 508 is an unit for storing audio/video stream inputted through the signal input unit 501, and a main control unit 510 functions to transmit commands relating to reproduction control/record control/nonlinear browsing control/indexing control to respective control modules.

Further, a record control unit 506 stores a stream information in the media storage unit 508, and an index generating unit 507 stores the stream information in an index storage unit 509. The index generating unit 507 also generates an index information from the audio/video stream inputted through the signal input unit 501 using an automatic video indexing and stores the index information in the index storage unit 509. In some cases, the index generating unit 507 functions to store a shot index information or a GOS index information, inputted through the signal input unit 501, in the index storage unit 509. Accordingly, the stream storage information, the shot index information (including the shot segmentation information) and the GOS index information are stored in the index storage unit 509.

An index management unit 505 transmits the stream storage information to the reproduction control unit 503 in order to provide a "trick play" that is a speed change function, such as "fast forward" and "fast rewind". The index management unit 505 also functions to provide the shot index information or the GOS index information, stored in the index storage unit 509, to a nonlinear video browsing (NLVB) control unit 504.

The record control unit 506 functions to provide the index generating unit 507 with information of stream being recorded, and to store the audio/video stream inputted from the signal input unit 501 in the media storage unit 508. The reproduction control unit 503 functions to transmit the media stream to the display unit 502 and to control a media reproduction. In some cases, the reproduction control unit 503 provides the NLVB function and the trick play through communication with the NLVB control unit 504 or the index management unit 505.

In addition, the NLVB control unit 504 communicates with the index storage unit 509 through the index management unit 505 and it is determined at which speed and which portion will be reproduced under a control of the reproduction control unit 503.

Hereinafter, an operation of the video reproducing apparatus with relation to the intelligent skip operation based on GOS will be described. If the intelligent skip request based on the GOS is inputted through the user interface 511 by the user, the main control unit 510 determines whether or not it is the intelligent skip request based on the GOS and provides an information on the determined result to the reproduction control unit 503.

Accordingly, the reproduction control unit 503 generates the GOS information from the shot index information or communicates with the NLVB control unit 504 in order to set the normal reproduction restart location according to the GOS-based dynamic skip request in consideration of the current reproduction location from the previously extracted GOS information. At this time, the NLVB control unit 504 determines the normal reproduction restart location, based on the shot index information or the GOS information, which is inputted through the index management unit 505, the information on whether the user's request is the forward skip request or the reverse skip request, and the current reproduction location of stream transmitted from the reproduction control unit 503. If the result is transmitted to the reproduction control unit 503, the reproduction control unit 503 moves the current location to the normal reproduction restart location at a time, or if it arrives at the normal reproduction restart location using the "Fast Forward" or "Fast Rewind" function, the normal reproduction of the media is restarted from the corresponding location.

By performing the intelligent skip through the above-described procedures, both of shot and scene structures are not needed in an implementation of the searching method and apparatus. Therefore, the structure and implementation of the index generating unit are simplified. Further, complicated user interface (UI) are not required in order to provide the function.

INDUSTRIAL APPLICABILITY

According to the video reproducing apparatus and the intelligent skip method of the present invention, it is possible to skip the advertisement scenes and to easily move to the accurate location (e.g., an anchor scene in news program) desired in the contents, which are impossible in the conventional time unit skip or FF/FR function.

Additionally, it is possible to fast move to the desired location with respect to the appropriate user input because the scene skip of very small unit is provided or the skip of very large unit is not provided.

Further, since the detection of the scene unit is not demanded, the present invention is not dependent on genre. Since the structure of the index generating unit also demands only the scene change detecting module, it is possible to provide the automation having a high degree accuracy.

Furthermore, the present invention can be implemented with the basic skip type in which undesired portions are not reproduced and the modified skip type in which undesired portion is reproduced at a fast speed and the normal reproduction is restarted from the desired location.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. An intelligent skip method for a video reproducing apparatus, comprising the steps of:
    calculating a GOS, to which a reproduction location of a current media belongs, according to a user's intelligent skip request, based on a current reproduction location of a media and a shot segmentation information or GOS information constituted with one long shot or a sequence of shot shots;
    determining whether the user's intelligent skip request is forward or reverse, based on the calculated GOS (GOScur) to which the reproduction location of the current media belongs;
    if the user's intelligent skip request is the forward skip request, setting a start time of a next GOS (GOScur+1) as a start time of a normal reproduction restart, and if the user's intelligent skip request is the reverse skip request, setting a start location of a GOS (GOScur), to which a reproduction location of a current media belongs, as a start time of a normal reproduction restart or setting a GOS (GOScur-1), which is before one from the GOS to which the reproduction location of the current media belongs, as a normal reproduction restart location; and
    performing a normal reproduction from the set normal reproduction restart location.

2. The intelligent skip method according to claim 1, wherein in the step of setting the normal reproduction restart location to the start location of the GOS (GOScur) or the start location of the GOS (GOScur-1) with respect to the user's reverse skip request, the normal reproduction restart location is set by selectively receiving a command through different user input means from a user or through different user operations by means of one user input means.

3. The intelligent skip method according to claim 1, wherein in the step of setting the normal reproduction restart location to the start location of the GOS (GOScur) or the start location of the GOS (GOScur-1) with respect to the user's reverse skip request, if an offset between the start locations of the reproduction location of the media and the GOS to which the reproduction location of the media belongs is equal to or less than a predetermined level, a start location of the GOS (GOScur-1) which is before one from the GOS (GOScur) is set as the start time of the reproduction restart, and if the offset is more than the predetermined level, the start location of the GOS (GOScur) is set as the start time of the reproduction restart.

4. An intelligent skip method for a video reproduction apparatus, comprising the steps of:
    based on a current reproduction location of a media and a shot segmentation information or a GOS information considering sequential shots having an identical length characteristic as one GOS, calculating a GOS to which a reproduction location of a current media according to a user's intelligent skip request and determining whether a type of the GOS is a GOS defined as one long shot or a sequence of short shots;
    based on the GOS (GOScur) to which the calculated reproduction location of the current media belongs, determining whether the user's intelligent skip request is forward or reverse;
    if the user's intelligent skip request is the forward skip request, setting a start location of a GOS, which is nearest from the current location among following GOSs (GOSr:r>cur) each being constituted with one long shot, as a start time of a normal reproduction restart;
    if the user's intelligent skip request is the reverse skip request and the GOS (GOScur) is a GOS constituted with one long shot, setting the start location of the GOS, to which the reproduction location of the current media belongs, as a start time of a normal reproduction restart time, or setting a start location of a GOS, which is nearest from the current location among GOSs (GOSr: r<cur) each being constituted with one long shot before the reproduction location of the current media, as a start time of a normal reproduction restart;
    if the user's intelligent skip request is the reverse skip request and the GOS (GOScur) to which the reproduction location of the current media belongs is a GOS constituted with a sequence of short shots, setting a start location of a GOS, which is nearest from the current location among the GOSs (GOSr:r<cur) each being constituted with one long shot before the reproduction location of the current media, as a start time of a normal reproduction restart; and
    performing a normal reproduction from the set normal reproduction restart location.

5. The intelligent skip method according to claim 4, wherein in the step of setting the start location of the GOS (GOScur) as the normal start location of the normal reproduction restart or setting the start location of the GOS, which is nearest from the current location among the GOSs each being constituted with one long shot before the reproduction location of the current media, as the start location of the normal reproduction restart with respect to the user's reverse skip request, the normal reproduction restart location is set by selectively receiving a command through different user input means from a user or through different user operations by means of one user input means.

6. The intelligent skip method according to claim 4, wherein in the step of setting the normal reproduction restart location to the start location of the GOS (GOScur) or the start time of the GOS, which is nearest from the current location among the GOSs each being constituted with one long shot before the reproduction location of the current media with respect to the user's reverse skip request, if an offset between the start locations of the reproduction location of the media and the GOS to which the reproduction location of the media belongs is equal to or less than a predetermined level, the start location of the GOS, which is nearest from the current location among the GOSs each being constituted with one long shot, is set as the start time of the reproduction restart, and if the offset is more than the predetermined level, the start location of the GOS (GOScur) is set as the start time of the reproduction restart.

7. The intelligent skip method according to claim 1 or 4, wherein the GOS is defined as a sequence of shots having the identical length characteristic, a shot having a length more than a specific threshold value is considered as a long shot, a shot having a length less than the specific threshold value is considered as a short shot, sequential short shots are configured to belong to one GOS, and the long shots constitutes one independent GOS.

8. The intelligent skip method according to claim 1 or 4, wherein the GOS information is calculated in real time according to the user's intelligent skip request by using a section information of shots extracted from inputted multimedia signals.

9. The intelligent skip method according to claim 1 or 4, wherein the GOS information is extracted before the user's intelligent skip request and indexed by using a section information of shots extracted from inputted multimedia signals.

10. The intelligent skip method according to claim 1 or 4, wherein when a location moves from the current reproduction location to the start time of the set normal reproduction restart, the reproduction of the media is paused, the reproduction location of the media is instantly replaced with the start time of the reproduction restart, and the normal reproduction is restarted from the corresponding location.

11. The intelligent skip method according to claim 1 or 4, wherein when a location moves from the current reproduction location to the start time of the set normal reproduction restart, the reproduction of the media is paused, the section from the current reproduction location of the media to the start time of the normal reproduction restart is reproduced according to the forward or reverse skip requests by using fast forward (FF) or fast rewind (FR) function, and the normal reproduction is restarted from the corresponding location if a location arrives at the normal reproduction location of the media.

\* \* \* \* \*